United States Patent
Carlson

(10) Patent No.: US 8,688,674 B2
(45) Date of Patent: Apr. 1, 2014

(54) FAST SEARCH IN A MUSIC SHARING ENVIRONMENT

(75) Inventor: Lucas S. Carlson, Portland, OR (US)

(73) Assignee: Beats Music, LLC, San Francisco, CA (US)

( * ) Notice: Subject to any disclaimer, the term of this patent is extended or adjusted under 35 U.S.C. 154(b) by 951 days.

(21) Appl. No.: 12/031,697

(22) Filed: Feb. 14, 2008

(65) Prior Publication Data

US 2009/0210448 A1 Aug. 20, 2009

(51) Int. Cl.
*G06F 17/30* (2006.01)

(52) U.S. Cl.
USPC .......................................... 707/706

(58) Field of Classification Search
USPC ................................ 707/742, 706
See application file for complete search history.

(56) References Cited

U.S. PATENT DOCUMENTS

| | | | |
|---|---|---|---|
| 6,055,508 A * | 4/2000 | Naor et al. ............... | 705/7.38 |
| 6,065,003 A * | 5/2000 | Sedluk .................... | 1/1 |
| 6,192,372 B1 * | 2/2001 | Yamaura et al. ......... | 1/1 |
| 6,526,411 B1 * | 2/2003 | Ward ....................... | 1/1 |
| 6,657,117 B2 * | 12/2003 | Weare et al. ............. | 84/668 |
| 6,735,583 B1 * | 5/2004 | Bjarnestam et al. ..... | 1/1 |
| 7,266,551 B2 * | 9/2007 | Kravets ................... | 1/1 |
| 7,487,145 B1 * | 2/2009 | Gibbs et al. ............ | 1/1 |
| 2002/0032019 A1 * | 3/2002 | Marks et al. .......... | 455/414 |
| 2004/0030682 A1 * | 2/2004 | Porter et al. ........... | 707/3 |
| 2004/0230574 A1 * | 11/2004 | Kravets ................... | 707/5 |
| 2006/0041560 A1 * | 2/2006 | Forman et al. ........ | 707/10 |
| 2006/0217828 A1 * | 9/2006 | Hicken .................. | 700/94 |
| 2007/0112761 A1 * | 5/2007 | Xu et al. ............... | 707/5 |
| 2007/0185860 A1 * | 8/2007 | Lissack ................. | 707/5 |
| 2007/0214133 A1 * | 9/2007 | Liberty et al. ........ | 707/5 |
| 2007/0226189 A1 * | 9/2007 | Piekos et al. ......... | 707/3 |
| 2007/0288237 A1 * | 12/2007 | Wu et al. .............. | 704/235 |
| 2008/0077570 A1 * | 3/2008 | Tang et al. ........... | 707/5 |
| 2008/0114761 A1 * | 5/2008 | Gross et al. .......... | 707/6 |
| 2008/0215623 A1 * | 9/2008 | Ramer et al. ......... | 707/104.1 |
| 2008/0319856 A1 * | 12/2008 | Zito et al. ............. | 705/14 |

* cited by examiner

*Primary Examiner* — Robert Beausoliel, Jr.
*Assistant Examiner* — Noosha Arjomandi
(74) *Attorney, Agent, or Firm* — Neal, Gerber & Eisenberg LLP

(57) ABSTRACT

A method, apparatus and system of method and system of directory sharing and management in a group communication environment is disclosed. In one embodiment, a method of a fast-search server includes processing a character of a query of music data, referencing the character with a reverse index of a music database, determining that the character matches a data record of the music database using the reverse index and returning the data record of the music database prior to receiving all characters of the query of music data from a user. The reverse index may be created from a combination of letters appearing as a string in a data field of the music database. The method may include preforking the character of the query of music data along with other processes in the fast-search server to minimize concurrency issues and to minimize threading locks.

18 Claims, 11 Drawing Sheets

FIGURE 4

| PARTIAL ENTRY 402 | REVERSE INDEX LOCATION 404 | ARTIST MATCH FIELD 406 | ALBUM MATCH FIELD 408 | TRACK MATCH FIELD 410 | LYRIC MATCH FIELD 412 | BLOG MATCH FIELD 414 | PLAYLIST MATCH FIELD 416 | OTHER 418 |
|---|---|---|---|---|---|---|---|---|
| MOR | 1523.5125.1245.21 | MORRISON, KURT | | | | | | |
| | | MORLAND, JACK | | | | | | |
| | | STEVEN, MORRY | | | | | | |
| | | | MORE IS EXCESS | | | | | |
| | | | FIGHT THE SKIDMORE | | | | | |
| | | | | MORE E LE | HAA MOREEE | | | |
| | | | | | | THE IMPORTANT IS MOR | | |
| XXX | 1523.5XXX.1XXX.XX | XXXYY | | | | | NONE | NONE |
| | | | X | | | | | |
| | | | | X | X | | | |
| | | | | | | X | | |
| | | | | | | | X | X |

STRING 420 (pointing to FIGHT THE SKIDMORE)

TABLE 450

US 8,688,674 B2

FAST SEARCH IN A MUSIC SHARING ENVIRONMENT

FIELD OF TECHNOLOGY

This disclosure relates generally to the technical fields of software and database technology and, in one example embodiment, to a method and system of directory sharing and management in a group communication environment.

BACKGROUND

A user may enter a query in a search engine (e.g., MOG®, imeem®, Spock®, Pandora®, Zillow®, Yelp®, etc.) optimized for a specific type of data (e.g., music, people search, lyrics, real estate, reviews, etc.). The user may have to enter all characters of the query in the search engine and click on a 'submit' button to transmit the query to a server having the specific type of data.

The user may be fatigued to enter the query entirely in the search engine every time the user wishes to search for the specific type of data. Furthermore, the user may become frustrated with an amount of time the user may have to wait to receive a response from a server having the specific type of data. As a result, the user may begin looking for an alternative search engine that delivers a faster search response for the specific type of data.

SUMMARY

A method and system of fast search in a music sharing environment is disclosed. In one aspect, a method of a fast-search server includes processing a character of a query of music data, referencing the character with a reverse index of a music database (e.g., may include albums, tracks, artist information, etc.), determining that the character matches a data record (e.g., text matching with the record data) of the music database using the reverse index and returning the data record of the music database prior to receiving all characters of the query of music data (e.g., for albums, for artists, etc.) from a user (e.g., the person who wants the music data).

The reverse index may be created from a combination of letters appearing as a string in a data field of the music database including an artist field, an album field and/or a track field. The method may include storing a search data (e.g., may include the previous characters typed in the query and/or other characters provided by different users querying the data record) of the user and other users in a local cache (e.g., a store for previous queries, a collection of previous records, etc.) of a client device (e.g., a computer, a mobile phone, etc.) to optimize speed of returning the data record of the music database prior to receiving all characters of the query of music data from the user. The method may also include storing a results data (e.g., may include the data record matching the search data) of the user and other users in the local cache of the client device to further optimize speed of returning the data record of the music database prior to receiving all characters of the query of music data from the user.

In addition, the method may include preforking the character of the query of music data along with other processes in the fast-search server to minimize concurrency issues and to minimize threading locks. The method may also include applying the local cache to retrieve a previous data record of previous characters typed in the query of music data before the user entered the character of the query through an application of the search data (e.g., using search cache) and the results data (e.g., using results cache) of the local cache in providing the previous data record when the user deletes an entry of the character of the query from the query.

The method may hold the character of the query of music data in the client device without transmitting the character to the fast-search server when the character of the query of music data may be included in a string having a set of characters 't', 'h', and 'e' as first characters of the query of music data provided by the user when a set amount of time between keystrokes is not exceeded. The method may transmit the character of the query of music data in the client device to the fast-search server when the character of the query of music data may be a character 't' included in the string having the set of characters 't', 'h', and 'e' as the first characters of the query of music data provided by the user when the set amount of time between keystrokes may be exceeded after entering the character 't'.

The method may further include applying a timer (e.g., system clock) in the client device to measure the set amount of time between keystrokes. An optimal time between keystrokes may be approximately 200 milliseconds. The method may include holding a first three characters of the query of music data in the client device without transmitting the character to the fast-search server when the set amount of time between keystrokes may be within the optimal time between keystrokes.

The method may transmit a first four characters of the query of music data in the client device to the fast-search server regardless of the set amount of time between keystrokes being within the optimal time between keystrokes to optimize an experience of the user to feel that the fast-search server may quickly responsive to the user. The method may also include holding a 'blank space' character of the query of music data in the client device without transmitting the 'blank space' character to the fast-search server to minimize trips between the client device and the fast-search server.

The method may apply a spelling index of the fast-search server which references a misspelling database of a central server to determine whether the query of music data may be a misspelling of the data record of the central server. The method may also include altering the misspelling of the query of music data to a correct spelling when the query of music data may be determined to be the misspelling of the data record.

In another aspect, a method of improving music search responsiveness include determining that a partial entry of a query of music data may included in a local cache of a client device built from previous searches of users of a central server having the music data, and returning a data record from the local cache based on the previous searches of users of the central server having the music data.

The method may hold the partial entry of the query of music data in the client device without transmitting the partial entry to a fast-search server when characters of the partial entry are included in a string having a set of characters 't', 'h', and 'e' as first characters of the query of music data provided by the user when a set amount of time between keystrokes is not exceeded. The method may transmit the partial entry of the query of music data in the client device to the fast-search server when a character of the partial entry may be a character 't' included in the string having the set of characters 't', 'h', and 'e' as the first characters of the query of music data provided by the user when the set amount of time between keystrokes is exceeded after entering the character 't'.

The method may also include applying a timer in the client device to measure the set amount of time between keystrokes. An optimal time between keystrokes may be approximately 200 milliseconds. The method may hold the partial entry in the client device without transmitting the partial entry to the fast-search server when the partial entry may be first three characters of the query of music data when the set amount of time between keystrokes is within the optimal time between keystrokes.

The method may transmit the partial entry in the client device to the fast-search server regardless of the set amount of time between keystrokes being within the optimal time between keystrokes when the partial entry may be a first four characters of the query of music data to optimize an experience of the user to feel that the fast-search server may quickly responsive to the user. The method may hold the partial entry in the client device without transmitting the partial entry to the fast-search server when the partial entry is a 'blank space' character of the query of music data to minimize trips between the client device and the fast-search server.

In yet another aspect, a system includes a central server to provide a data records of a music database a fast-search server coupled to the central server having a processing module to monitor and be responsive to a partial entry of a query of the data records of the music database using a reverse index of the data records of the music database a network of a client device coupled to the central server, the fast-search server through the network to locally cache previous partial searches and results of a users of client devices which query the data records of the music database of the central server.

In addition, the system may include a spelling module of the fast-search server to apply a spelling index which references a misspelling database of the central server to determine whether a query of music data may be a misspelling of the data records of the central server. The spelling module of the system may alter the misspelling of the query of music data to a correct spelling when the query of music data is determined to be the misspelling of one of the data records.

In addition, the system may include an optimization module of the client device to hold the partial entry of the query of the data records of the music database in the client device without transmitting the partial entry to the fast-search server when characters of the partial entry are part of a string having a set of characters 't', 'h', and 'e' as first characters of the query of the data records of the music database when a set amount of time between keystrokes is not exceeded. The optimization module of the system may also transmit the partial entry of the query of music data in the client device to the fast-search server when a character of the query of music data may be a character 't' included in the string having the set of characters 't', 'h', and 'e' as the first characters of the query of music data provided by the user when the set amount of time between keystrokes is exceeded after entering the character 't'.

The system may further include a timer module to apply a timer in the client device to measure the set amount of time between keystrokes. An optimal time between keystrokes may be approximately 200 milliseconds. The system may also include a keystroke module of the client device to hold the partial entry in the client device without transmitting the partial entry to the fast-search server when the partial entry is a first three characters of the query of music data when the set amount of time between keystrokes is within the optimal time between keystrokes.

The system may include a four-send module of the client device to transmit the partial entry in the client device to the fast-search server regardless of the set amount of time between keystrokes being within the optimal time between keystrokes when the partial entry may be a first four characters of the query of music data to optimize an experience of the user to feel that the fast-search server is quickly responsive to the user. In addition, the system may also include a space module of the client device to hold the partial entry in the client device without transmitting the partial entry to the fast-search server when the partial entry may be a 'blank space' character of the query of music data to minimize trips between the client device and the fast-search server.

The system may further include a delete module of the client device to apply the local cache to retrieve a previous record of previous characters typed in the query of music data before the user entered the partial entry of the query through an application of the local cache in providing the previous data record when the user deletes an entry of any character of the query from the query.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a table view of details associated with text match of partial query with the record data of the music database, according to one embodiment.

Other features of the present embodiments will be apparent from the accompanying drawings and from the detailed description that follows.

DETAILED DESCRIPTION

A method and system of directory sharing and management in a group communication environment is disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
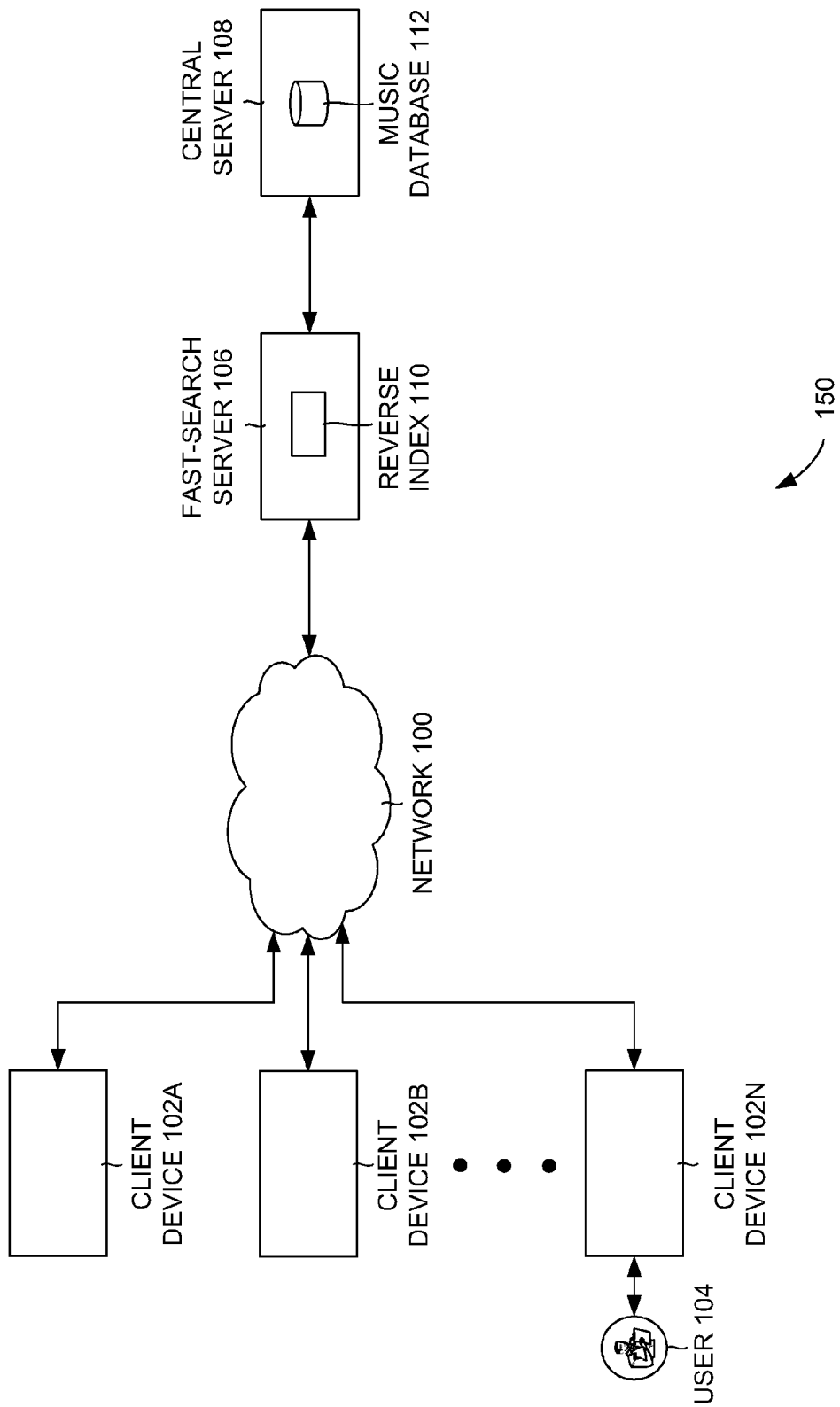
FIG. 1 is a system view of a set of client devices communicating with a fast-search server coupled to a central server, according to one embodiment.

In one embodiment, a method of a fast-search server (e.g., the fast search server 106 of FIG. 1) includes processing a character of a query of music data, referencing the character with a reverse index (e.g., the reverse index 110 of FIG. 1) of a music database (e.g., the music database 112 of FIG. 1), determining that the character matches a data record (e.g., may include an artist name, an artist album, a genre, an album data, a track data, a lyrics data, a blog post data, a user profile data, a user interest data, and/or a playlist data) of the music database 112 using the reverse index 110, and returning the data record of the music database 112 prior to receiving all characters of the query of music data from a user (e.g., the user 104 of FIG. 1).

In another embodiment, a method of improving music search responsiveness includes determining that a partial entry of a query of music data is included in a local cache (e.g., the local cache 214 of FIG. 2) of a client device (e.g., the client device 102A-N of FIG. 1) built from previous searches of users (e.g., present in search cache 216 of FIG. 2) of a central server (e.g., the central server 108 of FIG. 1) having the music data and returning a data record (e.g., present in results cache 218 of FIG. 2) from the local cache 214 based on the previous searches of the users 104 of the central server 108 having the music data.

In yet another embodiment, a system includes the central server 108 to provide data records (e.g., may include an artist name, an artist album, a genre, an album data, a track data, a lyrics data, a blog post data, a user profile data, a user interest data, and/or a playlist data) of a music database 112, a fast-search server 106 coupled to the central server 108 having a processing module (e.g., the processing module 200 of FIG. 2) to monitor and be responsive to a partial entry of a query of the data records of the music database 112 using a reverse index 110 of the data records of the music database 112, a network (e.g., the network 100 of FIG. 1) and a client device 102A-N coupled to the central server 108 and the fast-search server 106 through the network 100 to locally cache 214 previous partial searches (e.g., using the search cache 216 of FIG. 1) and results of users of client devices (e.g., using the results cache 218 of FIG. 1) which query the data records of the music database 112 of the central server 108.

FIG. 1 is a system view of a set of client devices 102 communicating with a fast-search server 106 coupled to a central server 108, according to one embodiment. Particularly, FIG. 1 illustrates a network 100, client devices 102A-N, a user 104, a fast-search server 106, a central server 108, a reverse index 110 and a music database 112, according to one embodiment.

The network 100 (e.g., Internet, wireless Internet, WAN, LAN, Bluetooth, Wi-Fi, Wi-Max, telecommunications, radio frequency and/or infrared network, etc.) may enable communication between the user 104 and the central server 108 through the fast search server 106. The client devices 102A-N (e.g., personal computer, a mobile phone, etc.) may enable the user 104 to transmit a query for data records associated with the music database 112 (e.g., artist name, track name, album name, etc.) to the central server 108.

The user 104 may have a query associated with the music data (e.g., artist name, track name, album name, etc.). The fast-search server 106 may accept the incoming characters of query entered by the user 104 even before the query is completed and may reference them with the reverse index 110 of a music database 112 to get the response associated with the partial query. The central server 108 may include a music database 112 which may have all the record data associated with the music (e.g., artist name, track name, album name, etc.).

The reverse index 110 may be created from a combination of letters appearing as a string in a data field of the music database 112 including an artist field, an album field, and/or a track. The characters of the query may be referenced to the reverse index 110 in order to determine the music information associated with query to get the response associated with query from the music database 112. The music database 112 may include all the information associated with the music data (e.g., artist name, album name, track numbers, kind of music, etc.).

In the example embodiment illustrated in FIG. 1, the user 104 may interact with the central server 108 from the client devices 102A-N through the network 100 (e.g., internet). The fast-search server 106 may interact with the client devices 102A-N accepting the characters from a partial query entered by the user 104 and may provide a response associated with the partial query to the client devices 102A-N.

In one embodiment, a central server 108 may provide data records (e.g., may include an artist name, an artist album, a genre, an album data, a track data, a lyrics data, a blog post data, a user profile data, a user interest data, and/or a playlist data) of a music database 112. A fast-search server 106 coupled to the central server 108 may have a processing module 110 to monitor and be responsive to a partial entry of a query of the data records of the music database 112 using a reverse index (e.g., the reverse index 304 of FIG. 3) of the data records of the music database 112. The system may include a network 100.

A client device 102A-N coupled to the central server 108 and the fast-search server 106 through the network may locally cache previous partial searches and results of users of client devices which query the data records of the music database of the central server. The reverse index may be created from a combination of letters appearing as a string in a data field of the music database and from data fields of the music database including an artist field, an album field, and/or a track. The user 104 may search for a particular information associated with the music data using a query. The characters may be transmitted to the fast-search server before the query input is completed and the possible response associated with query is transmitted back to client device.

Figure 2:
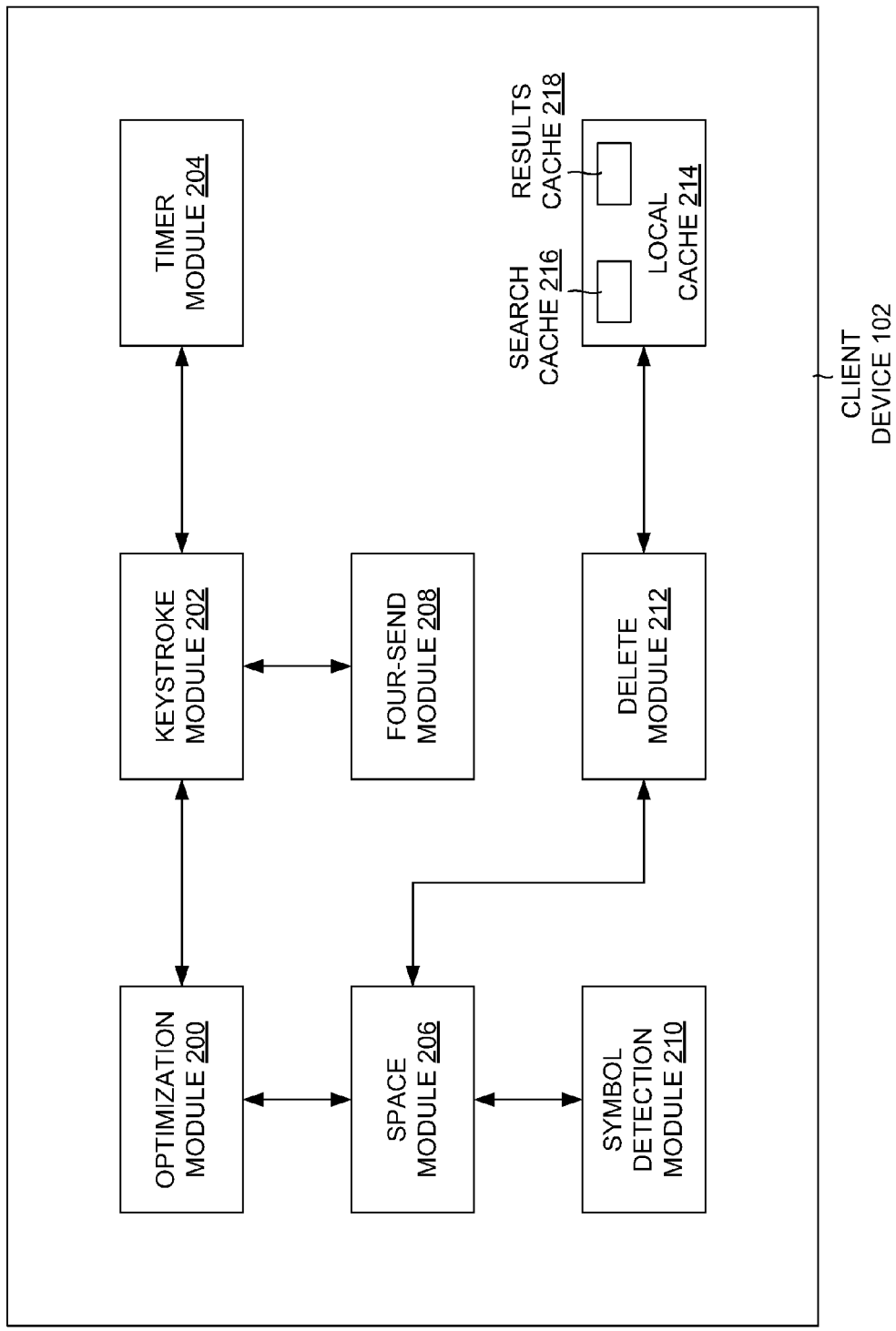
FIG. 2 is an exploded view of the client device, according to one embodiment.

FIG. 2 is an exploded view of the client devices 102A-N of FIG. 1, according to one embodiment. Particularly, FIG. 2 illustrates an optimization module 200, a keystroke module 202, a timer module 204, a space module 206, a four-send module 208, symbol detection module 210, a delete module 212, a local cache 214, a search cache 216 and results cache 218, according to one embodiment.

The optimization module 200 may hold the partial entry of the query (e.g., en for Enrique, enigma, etc) of the data records of the music database 112 in the client device 102A-N without transmitting the partial entry to the fast-search server 106 when characters of the partial entry are part of a string having a set of characters 't', 'h', and 'e' as first characters of the query of the data records of the music database 112 when a set amount of time between keystrokes (e.g., 200 milliseconds) is not exceeded.

The keystroke module 202 may hold the partial entry in the client device 102A-N without transmitting the partial entry to the fast-search server 106 when the partial entry is a first three characters of the query of music data (e.g., bil for Bilamos, Billy, etc.) when the set amount of time between keystrokes is within the optimal time (e.g., 200 milliseconds) between keystrokes. The timer module 204 may apply a timer in the client device 102A-N to measure the set amount of time between keystrokes.

The space module 206 may hold the partial entry in the client device 102A-N without transmitting the partial entry to the fast-search server 106 when the partial entry is a 'blank space' character of the query of music data to minimize trips between the client device 102A-N and the fast-search server 106. The four-send module 208 may transmit the partial entry in the client device 102A-N to the fast-search server 106 regardless of the set amount of time between keystrokes being within the optimal time between keystrokes (e.g., 200 milliseconds) when the partial entry is a first four characters of the query of music data (e.g., Ast for a group named Astroidrocker's songs, etc.) to optimize an experience of the user 104 to feel that the fast-search server 106 is quickly responsive to the user 104.

The symbol detection module 210 may transmit any symbols by the user 104 and respond to them in association with music data containing symbols (e.g., pi (symbol) representing Clint Mansell). The delete module 212 may apply the local cache to retrieve a previous record of previous characters typed in the query of music data (e.g., track name, artist name, etc.) before the user 104 entered the partial entry of the query through an application of the local cache 214 in providing the previous data record when the user 106 deletes an entry of any character of the query from the query. The local cache 214 may contain search cache 216 and results cache 218.

The local cache 214 may contain the information associated with previous searches, results and/or queries. The search cache 216 may have the content (e.g., search content) associated with the previous search and queries (e.g., Enrique, enigma, etc). The results cache 218 may have the result (e.g., en for Enrique, enigma, etc) content associated with the previous queries.

In the example embodiment illustrated in FIG. 2, the client device 102A-N may include the optimization module 200, keystroke module 202, space module 206, four-send module 208, symbol detection module 210, delete module 212 may communicate with each other to control (e.g., hold, transmit, etc) the flow of characters from the client device 102A-N to the fast-search server 106 through a network (e.g., internet). The timer module 204 may keep the track of timings (e.g., using system clock, etc.) associated with the keystrokes.

The local cache 214 includes search cache 216 and results cache 218 containing information of previous search and/or results, according to the example embodiment illustrated in FIG. 2. The local cache 214 may be used to get the music data associated with the query using previous searches and corresponding results when the query is similar to the previous search query.

In one embodiment, a character may be processed of a query of music data (e.g., artist name, album name, etc.). The character may be referenced with a reverse index 110 of a music database 112. It may be determined that the character matches a data record (e.g., may include an artist name, an artist album, a genre, an album data, a track data, a lyrics data, a blog post data, a user profile data, a user interest data, and/or a playlist data) of the music database 112 using the reverse index 110.

The data record of the music database 112 may be returned prior to receiving all characters of the query of music data from a user 106. The reverse index 110 may be created from a combination of letters appearing as a string in a data field of the music database 112 and from data fields of the music database 112 including an artist field, an album field, and/or a track field. A search data (e.g., may include the previous characters typed in the query and/or other characters provided by different users querying the data record) of the user 104 and other users may be stored in a local cache 214 of a client device 102A-N to optimize speed of returning the data record of the music database 112 prior to receiving all characters of the query of music data from the user 104.

A results data (e.g., may include the data record matching the search data) of the user 104 and other users may be stored in the local cache 214 of the client device 102A-N to further optimize speed of returning the data record of the music database 112 prior to receiving all characters of the query of music data from the user 104. The local cache 214 may be applied to retrieve a previous data record of previous characters typed in the query of music data before the user entered the character of the query through an application of the search data (e.g., using the magic button 502 of FIG. 5) and the results data of the local cache 214 in providing the previous data record when the user 104 deletes an entry of the character of the query from the query.

The character of the query of music data may be held in a client device 102A-N without transmitting the character to the fast-search server 106 when the character of the query of music data is included in a string having a set of characters 't', 'h', and 'e' as first characters of the query of music data provided by the user 104 when a set amount of time between keystrokes (e.g., 200 milliseconds) is not exceeded.

The character of the query of music data in the client device 102A-N may be transmitted to the fast-search server 106 when the character of the query of music data is a character 't' included in the string having the set of characters 't', 'h', and 'e' as the first characters of the query of music data provided by the user 104 when the set amount of time between keystrokes is exceeded after entering the character 't'.

A timer (e.g., a clock) may be applied in the client device 102A-N to measure the set amount of time between keystrokes. An optimal time between keystrokes may be approximately 200 milliseconds. A first three characters of the query of music data may be held in the client device 102A-N without transmitting the character to the fast-search server 106 when the set amount of time between keystrokes is within the optimal time between keystrokes.

A first four characters of the query of music data in the client device 102A-N may be transmitted to the fast-search server 106 regardless of the set amount of time between keystrokes being within the optimal time between keystrokes to optimize an experience of the user 104 to feel that the fast-search server 106 is quickly responsive to the user 104. A 'blank space' character of the query of music data may be held in the client device 102A-N without transmitting the 'blank space' character to the fast-search server 106 to minimize trips between the client device 102A-N and the fast-search server 106.

It may be determined that a partial entry of a query of music data is included in a local cache 214 of a client device 102A-N built from previous searches of users 104 of a central server 108 having the music data. A data record may be returned from the local cache 214 based on the previous searches of the users 104 of the central server 108 having the music data. The partial entry of the query of music data may be held in the client device 102A-N without transmitting the partial entry to a fast-search server 106 when characters of the partial entry are included in a string having a set of characters 't', 'h', and 'e' as first characters of the query of music data provided by the user 104 when a set amount of time between keystrokes is not exceeded.

The partial entry of the query of music data in the client device 102A-N may be transmitted to the fast-search server 106 when a character of the partial entry is a character 't' included in the string having the set of characters 't', 'h', and 'e' as the first characters of the query of music data provided by the user 104 when the set amount of time between keystrokes is exceeded after entering the character 't'. The timer may be applied in the client device 102A-N to measure the set amount of time between keystrokes.

The optimal time between keystrokes may be approximately 200 milliseconds. The partial entry may be held in the client device 102A-N without transmitting the partial entry to the fast-search server 106 when the partial entry is a first three characters of the query of music data when the set amount of time between keystrokes is within the optimal time between keystrokes. The partial entry in the client device 102A-N may be transmitted to the fast-search server 106 regardless of the set amount of time between keystrokes being within the optimal time between keystrokes when the partial entry is a first four characters of the query of music data to optimize an experience of the user 104 to feel that the fast-search server is quickly responsive to the user 104.

The partial entry may be held in the client device 102A-N without transmitting the partial entry to the fast-search server 106 when the partial entry is a 'blank space' character of the query of music data to minimize trips between the client device 102A-N and the fast-search server 106. An optimization module (e.g., the optimization module 200 of FIG. 2) of the client device 102A-N may hold the partial entry of the query of the data records of the music database 112 in the client device 102A-N without transmitting the partial entry to the fast-search server 106 when characters of the partial entry are part of a string having a set of characters 't', 'h', and 'e' as first characters of the query of the data records of the music database 112 when a set amount of time between keystrokes is not exceeded, and to transmit the partial entry of the query of music data in the client device 102A-N to the fast-search server 106 when a character of the query of music data is a character 't' included in the string having the set of characters 't', 'h', and 'e' as the first characters of the query of music data provided by the user 104 when the set amount of time between keystrokes is exceeded after entering the character 't'.

A timer module may apply a timer in the client device 102A-N to measure the set amount of time between keystrokes. The optimal time between keystrokes may be approximately 200 milliseconds. The keystroke module 202 of the client device 102A-N may hold the partial entry in the client device 102A-N without transmitting the partial entry to the fast-search server 106 when the partial entry is the first three characters of the query of music data when the set amount of time between keystrokes is within the optimal time between keystrokes.

The four-send module 208 of the client device 102A-N may transmit the partial entry in the client device 102A-N to the fast-search 106 server regardless of the set amount of time between keystrokes being within the optimal time between keystrokes when the partial entry is a first four characters of the query of music data to optimize an experience of the user 104 to feel that the fast-search server 106 is quickly responsive to the user 104. The space module 206 of the client device 102A-N may hold the partial entry in the client device 102A-N without transmitting the partial entry to the fast-search server 106 when the partial entry is a 'blank space' character of the query of music data to minimize trips between the client device 102A-N and the fast-search server 106.

The delete module 212 of the client device 102A-N may apply the local cache 214 to retrieve a previous record of previous characters typed in the query of music data before the user 104 entered the partial entry of the query through an application of the local cache 214 in providing the previous data record when the user 104 deletes an entry of any character of the query from the query.

Figure 3:
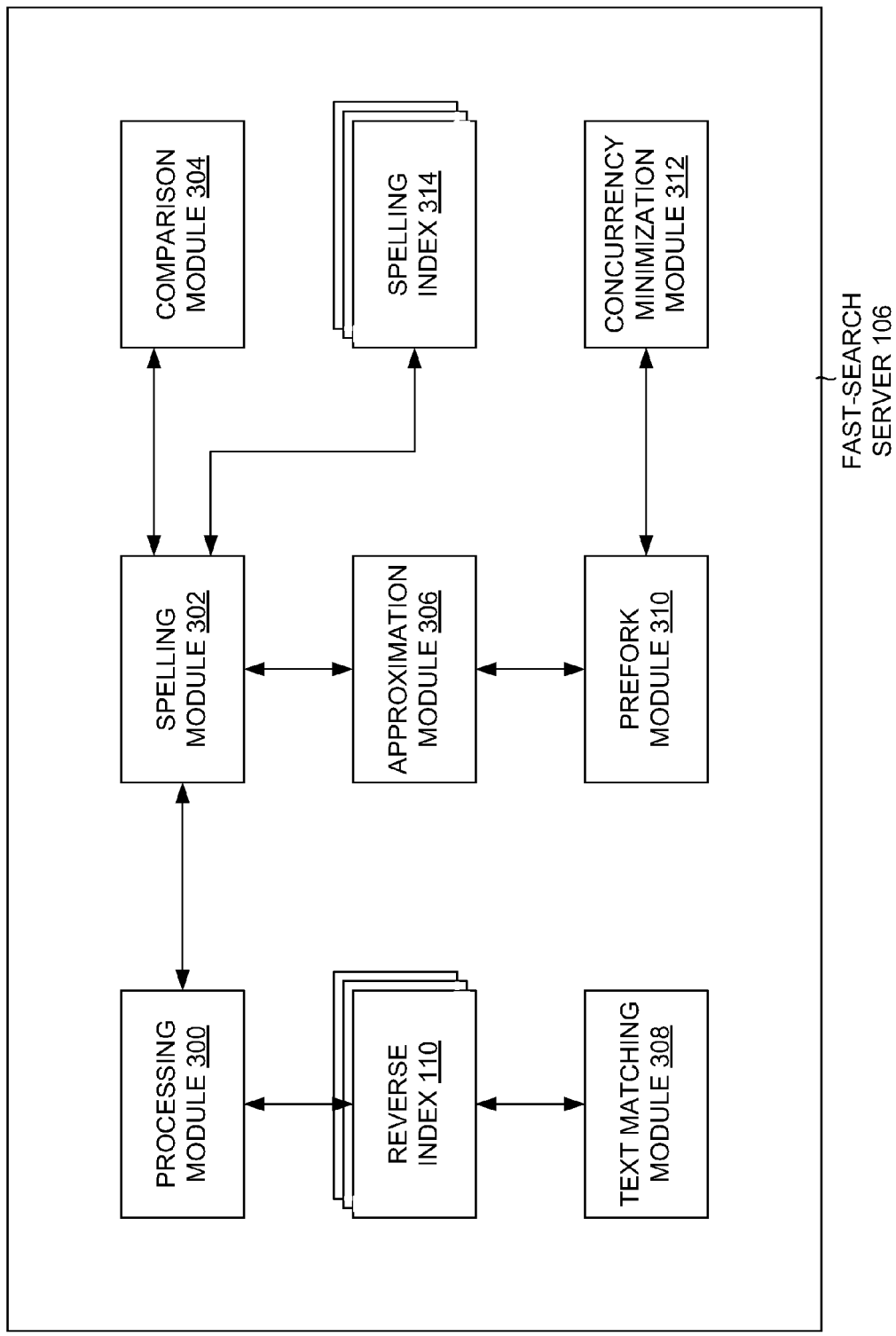
FIG. 3 is an exploded view of the fast-search server, according to one embodiment.

FIG. 3 is an exploded view of the fast-search server 106 of FIG. 1, according to one embodiment. Particularly, FIG. 3 illustrates a processing module 300, a spelling module 302, a comparison module 304, an approximation module 306, a text matching module 308, a prefork module 310, a concurrency minimization module 312, and a spelling index module 314, according to one embodiment.

The processing module 300 may monitor and be responsive to a partial entry of a query of the data records of the music database 112 using a reverse index 110 of the data records of the music database 112. The spelling module 302 may apply a spelling index 314 which references a misspelling database of the central server 108 to determine whether a query of music data is a misspelling of the data records of the central server 108, and may alter the misspelling of the query of music data to a correct spelling when the query of music data is determined to be the misspelling of one of the data records.

The comparison module 304 may compare the query to previous search queries to respond if the query matches to the previous search queries. The approximation module 306 module may pull out all the approximate results associated with the query. The text matching module 308 may pull out all the records (e.g., artist name, album, track, blogs, etc.) associated with the query having the matching text.

The prefork module 310 may prefork the character of the query of music data along with other processes in the fast-search server 106 to minimize concurrency issues and/or to minimize threading locks. The concurrency minimization module 312 minimize in association with the perfork module 310 may minimize the concurrency issues. The spelling index module 314 may refer a misspelling database of a central server 108 to determine whether the query of music data (e.g., em in place of en for Enrique) is a misspelling of the data record of the central server 108.

In the example embodiment illustrated in FIG. 3, the fast-search server 106 may include the processing module 300 and reverse index 110 communicating with each other. The text matching module 308 and reverse index 110 may communicate with each other. The spelling module 302 may communicate with approximation module 306 the spelling index 314, and the comparison module 304. The approximation module 306 and prefork module 310 may communicate with each other. The concurrency minimization module 312 and the prefork module 310 may communicate with each other, according to the example embodiment illustrated in FIG. 3.

In one embodiment, the character of the query of music data may be preforked along with other processes in the fast-search server (e.g., the fast search server 106 of FIG. 1) to minimize concurrency issues and to minimize threading locks. A spelling index of the fast-search server may be applied which references a misspelling database of a central server (e.g., the central server 106 of FIG. 1) to determine whether the query of music data is a misspelling of the data record of the central server 106. The misspelling of the query of music data may be altered to a correct spelling when the query of music data is determined to be the misspelling of the data record.

A spelling module 302 of the fast-search server 106 may apply a spelling index 314 which references a misspelling database of the central server 108 to determine whether a query of music data is a misspelling of the data records of the central server 108, and to alter the misspelling of the query of music data to a correct spelling when the query of music data is determined to be the misspelling of one of the data records. The spelling index 314 may include combinations of spellings for referring the wrong spelling to correct one in order to get an accurate response associated with the query.

The characters of the query may be referenced to the reverse index 110 in order to determine the music information associated with query to get the response associated with query from the music database 112.

FIG. 4 is a table view of details associated with text match of partial query with the record data of the music database 112, according to one embodiment. Particularly, FIG. 4 illustrates a partial entry field 402, a reverse index location field 404, a artist match field 306, an album match field 408, a track match field 410, a lyric match field 412, a blog match field 414, a play list match field 416 and an other field 418, according to one embodiment.

The partial entry field 402 may display a partial query (e.g., mor, en, ba, etc). The reverse index location field 404 may display the location of the reverse index 110 associated with the query. The artist match field 306 may display the name of the artists matching with text of the partial query (e.g., en for Enrique, mor for Morrison, etc.). The album match field 408 may display titles of the album (e.g., More is excess, etc) matching with text of the partial query. The track match field 410 may display the tracks (e.g., mor e le, etc.) matching with text of the partial query.

The lyric match field 412 may display a part of lyrics (e.g., haaa moreeee, etc.) which matches with text of the partial query. The blog match field 414 may display the text present in the blog (e.g., the important is more, etc.) associated with the music data. The playlist match field 416 may display playlist title matching with the text of the query. The other field 418 may display any other information that matches with the characters associated with the partial query text in the central server 108.

In the example embodiment illustrated in FIG. 4, the partial entry field 302 displays "mor" in the first row, indicating the partial query (e.g., en for Enrique, etc.) in the partial entry 402 column. The reverse index location field 404 displays "1523.5125.1245.21" in the first row, indicating the IP address (e.g., location of reverse index) in the reverse index location field 404 column. The artist match field 406 displays "Morrison, Kurt" in the first row, "Morland, Jack" in the second row, "Steven, Morry" in the third row, indicating the artist name (e.g., Enrique, Ricky Martin, etc.) in the artist match field 406 column that is matching with the text of the parial query.

The artist match field 406 displays "Morrison, Kurt" in the first row, "Morland, Jack" in the second row, "Steven, Morry" in the third row, indicating the artist name (e.g., Enrique, Ricky Martin, etc.) in the artist match field 406 column that is matching with the text of the parial query.

The album match field 408 displays "more is excess" in the fourth row, "fight the skidmore" in the fifth row, indicating the album name (e.g., aqua, etc.) in the album field 408 column that is matching with the text of the parial query. The track match field 410 displays "mor e le" in the sixth row, indicating the track name (e.g., everything I do of Bryan Adams, etc.) in the track match field 410 column that is matching with the text of the parial query. The lyric match field 412 displays "haaa moreeee" in the seventh row, indicating the text of part of lyric (e.g., "my oh my" of Aqua, etc.) in the lyric match field 412 column that is matching with the text of the parial query.

The blog match field 414 displays "the important is mor" in the eight row, indicating the text content in blog in the blog match field 414 column that is matching with the text of the parial query. The play list match field 416 displays "none" in the ninth row, indicating the nothing in the play list match field 416 column that is matching with the text of the parial query. The other field 418 displays "none" in the ninth row, indicating the nothing matching in the other field 418 column that is matching with the text of the parial query.

Figure 5:
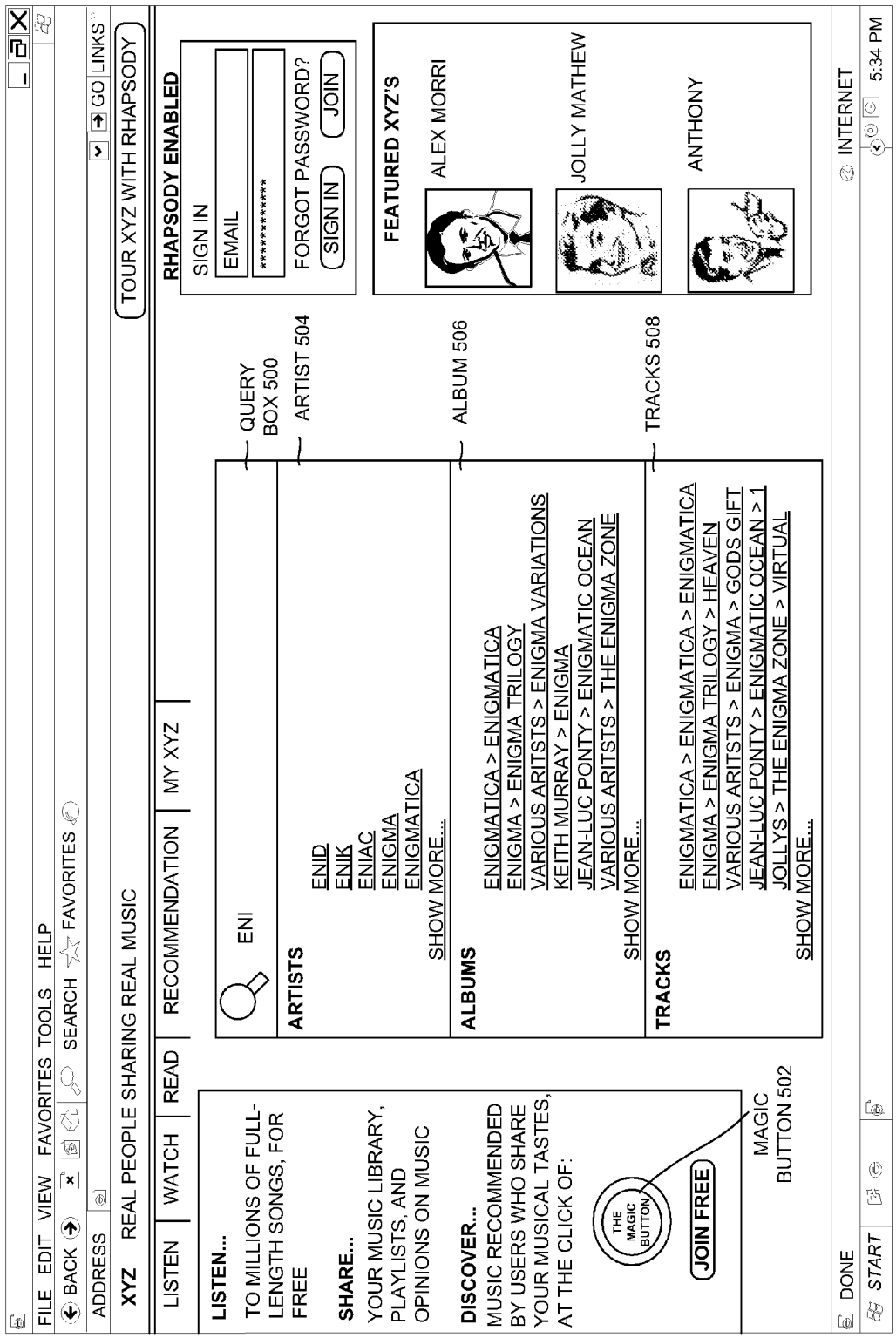
FIG. 5 is a user interface view of a searching a record data associated with music data by entering the query in the query box and getting the response associated with the partial query before the completion of query associated with the music data, according to one embodiment.

FIG. 5 is a user interface view 550 of a searching a record data associated with music data by entering the query in the query box 502 and getting the response associated with the partial query before the completion of query associated with the music data, according to one embodiment. Particularly, FIG. 5 illustrates a query box 500, a magic button 502, a artist results 504, an album results 506 and a tracks results 508, according to one embodiment.

The query box 500 may be a text box where the user 102 may input his query associated with music data. The magic button 502 may enable the user 104 to set up a local cache 214 in the client device 102A-N. The artist results 504 may display the possible artists names (e.g., Enigma, etc. as illustrated in the FIG. 5) that are matching the text of the user's partial query (e.g., eni, as illustrated in FIG. 5). The album results 506 may display the possible album names (e.g., Enigmatica, etc. as illustrated in FIG. 5) matching with the text of the user's partial query (e.g., eni, as illustrated in FIG. 5). The tracks results 508 may display the possible track names that are matching with the text of the user's 104 partial query (e.g., eni, as illustrated in FIG. 5).

In the example embodiment illustrated in FIG. 5, the user interface view 550 displays the user's 104 query in the query box 502. The response for the partial query may be seen as a window near the query box 502 including artists results 504, the album results 506, the track results 508, etc. The magic button 502 may allow the user 104 to set up a cache in the client device 102A-N.

Figure 6:
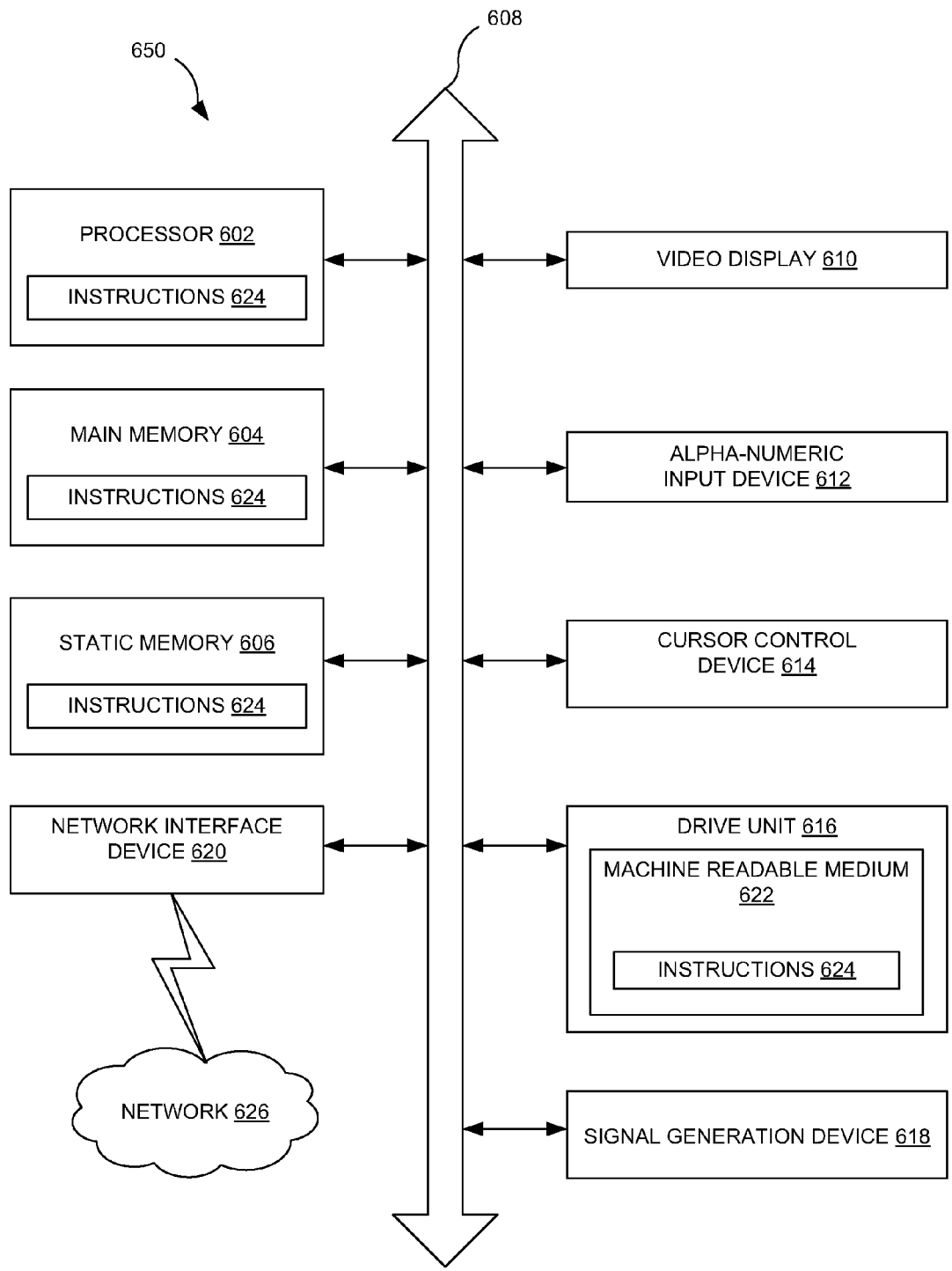

FIG. 6 is a diagrammatic system view 650 of a data processing system in which any of the embodiments disclosed herein may be performed, according to one embodiment. Particularly, the diagrammatic system view 650 of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624 and a network 626, according to one embodiment.

The diagrammatic system view 600 may indicate a personal computer and/or a data processing system in which one or more operations disclosed herein may be performed. The processor 602 may be a microprocessor, a state machine, an application-specific integrated circuit, a field programmable gate array, etc. (e.g., Intel® Pentium® processor). The main memory 604 may be a dynamic random access memory and/or a primary memory of a computer system. The static memory 606 may be a hard drive, a flash drive, and/or other memory information associated with the data processing system.

The bus 606 may be an interconnection between various circuits and/or structures of the data processing system. The video display 610 may provide graphical representation of information on the data processing system. The alpha-numeric input device 612 may be a keypad, a keyboard and/or any other input device of text (e.g., a special device to aid the physically challenged). The cursor control device 614 may be a pointing device such as a mouse.

The drive unit 616 may be the hard drive, a storage system, and/or other longer term storage subsystem. The signal generation device 618 may be a bios and/or a functional operating system of the data processing system. The network interface device 620 may be a device that may perform interface functions such as code conversion, protocol conversion and/or buffering required for communication to and from a network 626.

The machine readable medium 622 may provide instructions on which any of the methods disclosed herein may be performed. The instructions 624 may provide source code and/or data code to the processor 602 to enable any one or more operations disclosed herein.

Figure 7A:
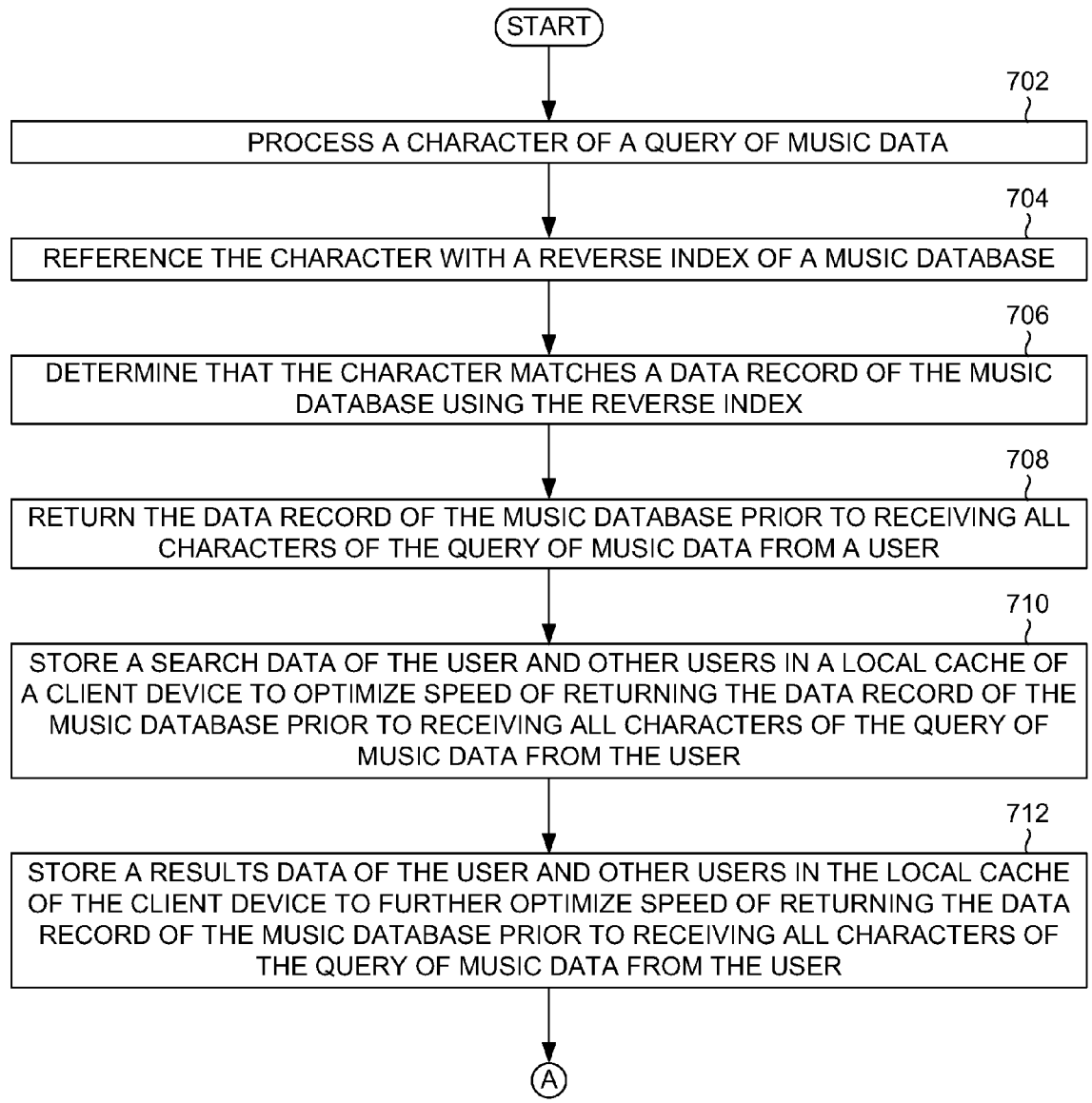
FIG. 7A is a process flow of searching a data record of music database and storing a search data and a results data in a local cache, according to one embodiment.

FIG. 7A is a process flow of searching a data record of music database (the music database 112 of FIG. 1) and storing a search data and a results data in a local cache (e.g., the local cache 214 of FIG. 2), according to one embodiment. In operation 702, a character may be processed of a query of music data. In operation 704, the character may be referenced with a reverse index (e.g., the reverse index 110 of FIG. 1) of a music database (e.g., the music database 112 of FIG. 1).

In operation 706, the character may be determined that matches a data record of the music database 112 using the reverse index 110 (e.g., using a fast-search server 106 of FIG. 1). In operation 708, the data record of the music database 112 may be returned prior to receiving all characters of the query of music data from a user (e.g., the user 104 of FIG. 1). For example, the reverse index may be created from a combination of letters appearing as a string in a data field of the music database 112 including an artist field, an album field/or and a track field.

In operation 710, the search data (e.g., may include the previous characters typed in the query, other characters provided by different users querying the data record and/or the results data includes the data record matching the search data) of the user 104 and other users may be stored in the local cache 214 (e.g., in the search cache 216 in local cache 214 of FIG. 2) of a client device 102A-N to optimize speed of returning the data record of the music database 112 prior to receiving all characters of the query of music data from the user 104.

In operation 712, the results data (e.g., may includes the data record matching the search data) of the user 104 and other users may be stored in the local cache 214 of the client device 102A-N (e.g., the results cache 218 in local cache 214 of FIG. 2) to further optimize speed of returning the data record of the music database 112 prior to receiving all characters of the query of music data from the user 104.

Figure 7B:
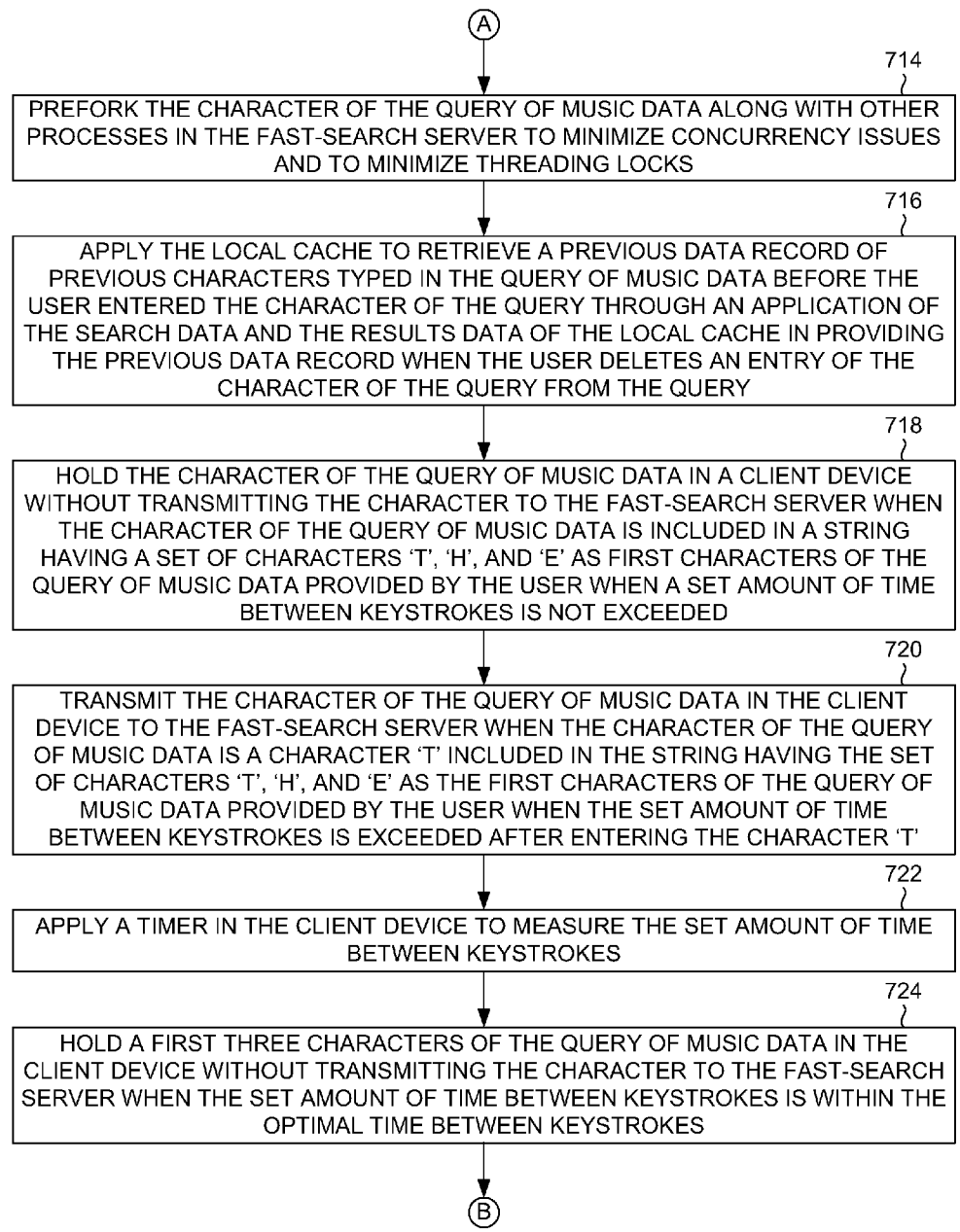
FIG. 7B is a continuation of the process flow of FIG. 7A illustrating additional processes, according to one embodiment.

FIG. 7B is a continuation of the process flow of FIG. 7A illustrating additional processes, according to one embodiment. In operation 714, the character of the query of music data may be preforked (e.g., using the prefork module 310 of FIG. 3) along with other processes in the fast-search server (e.g., the fast-search server 106 of FIG. 1) to minimize concurrency issues and to minimize threading locks.

In operation 716, the local cache 214 may be applied to retrieve a previous data record of previous characters typed in the query of music data (e.g., using the magic button 502 of FIG. 5) before the user 104 entered the character of the query through an application of the search data and the results data of the local cache 214 in providing the previous data record when the user 104 deletes an entry of the character of the query from the query.

In operation 718, the character of the query of music data may be held in a client device 102A-N without transmitting the character to the fast-search server 106 when the character of the query of music data may be included in a string having a set of characters 't', 'h', and 'e' as first characters of the query of music data (e.g., using the optimization module 200 of FIG. 2) provided by the user 104 when a set amount of time (e.g., 200 milliseconds) between keystrokes is not exceeded.

In operation 720, the character of the query of music data may be transmitted in the client device 102A-N to the fast-search server 106 when the character of the query of music data may be a character 't' included in the string having the set of characters 't', 'h', and 'e' as the first characters of the query of music data (e.g., using the optimization module 200 of FIG. 2) provided by the user 104 when the set amount of time between keystrokes may be exceeded after entering the character 't'.

In operation 722, a timer (e.g., a clock, countdown, etc) may be applied (e.g., using a timer module 204 of FIG. 2) in the client device 102A-N to measure the set amount of time between keystrokes. An optimal time between keystrokes may be approximately 200 milliseconds. In operation 724, a first three characters of the query of music data may be held (e.g., using a keystroke module 202 of FIG. 2) in the client device 102A-N without transmitting the character (e.g., enr for Enrique, etc.) to the fast-search server 106 when the set amount of time between keystrokes may be within the optimal time (e.g., 200 milliseconds) between keystrokes.

Figure 7C:
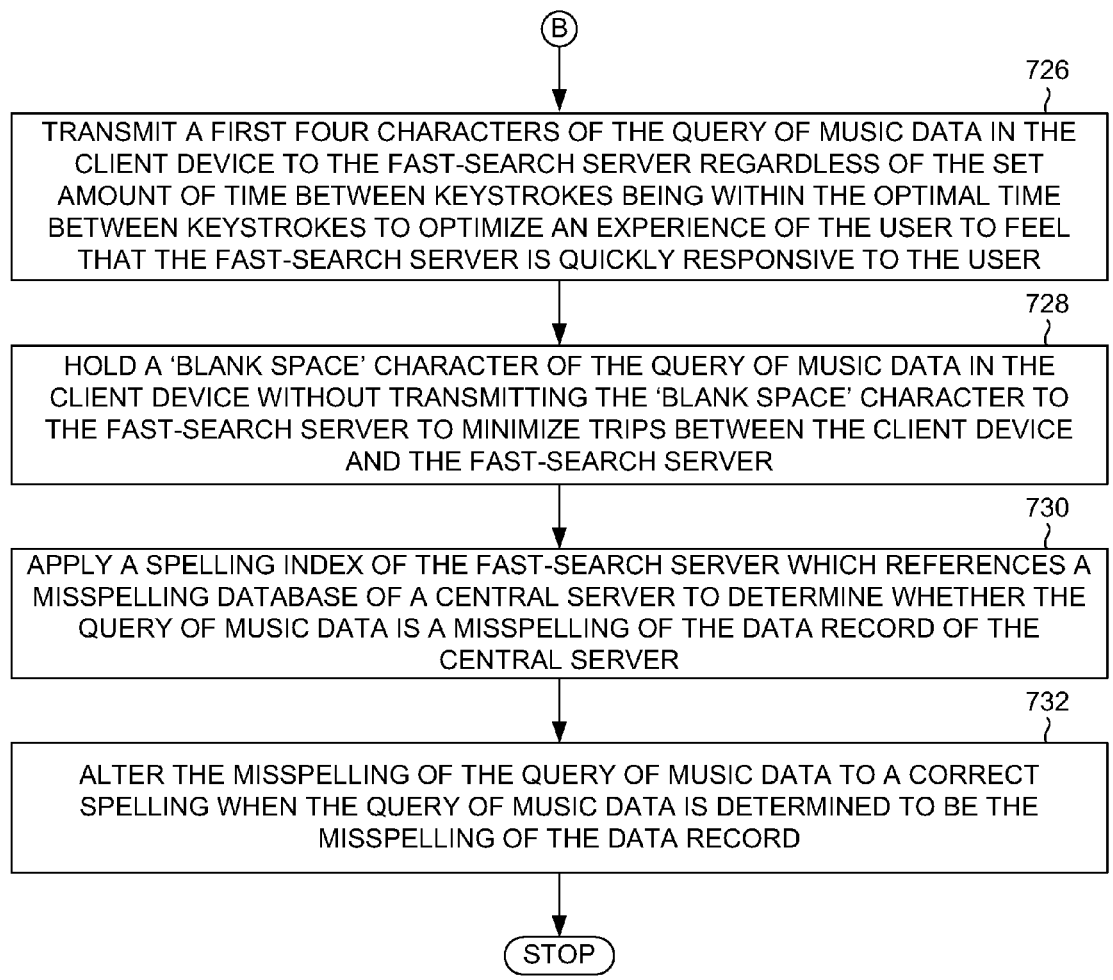
FIG. 7C is a continuation of the process flow of FIG. 7B illustrating additional processes, according to one embodiment.

FIG. 7C is a continuation of the process flow of FIG. 7B illustrating additional processes, according to one embodiment. In operation 726, a first four characters of the query of music data may be transmitted (e.g., using the four-send module 208 of FIG. 2) in the client device 102A-N to the fast-search server 106 regardless of the set amount of time between keystrokes (e.g., time gap between typing two keys) being within the optimal time (e.g., 200 milliseconds) between keystrokes to optimize an experience of the user 104 to feel that the fast-search server 106 may be quickly responsive to the user 104.

In operation 728, a 'blank space' character of the query of music data may be held (e.g., using the space module 206 of FIG. 2) in the client device 102A-N without transmitting the 'blank space' character to the fast-search server to minimize trips between the client device 102A-N and the fast-search server 106. In operation 730, a spelling index may be applied (e.g., using the spelling module 302 of FIG. 3) in the fast-search server 106 which references a misspelling database of a central server 108 to determine whether the query of music data may be misspelling of the data record of the central server 108. In operation 732, the misspelling of the query of music data to a correct spelling may be altered when the query of music data may be determined to be the misspelling of the data record.

Figure 8A:
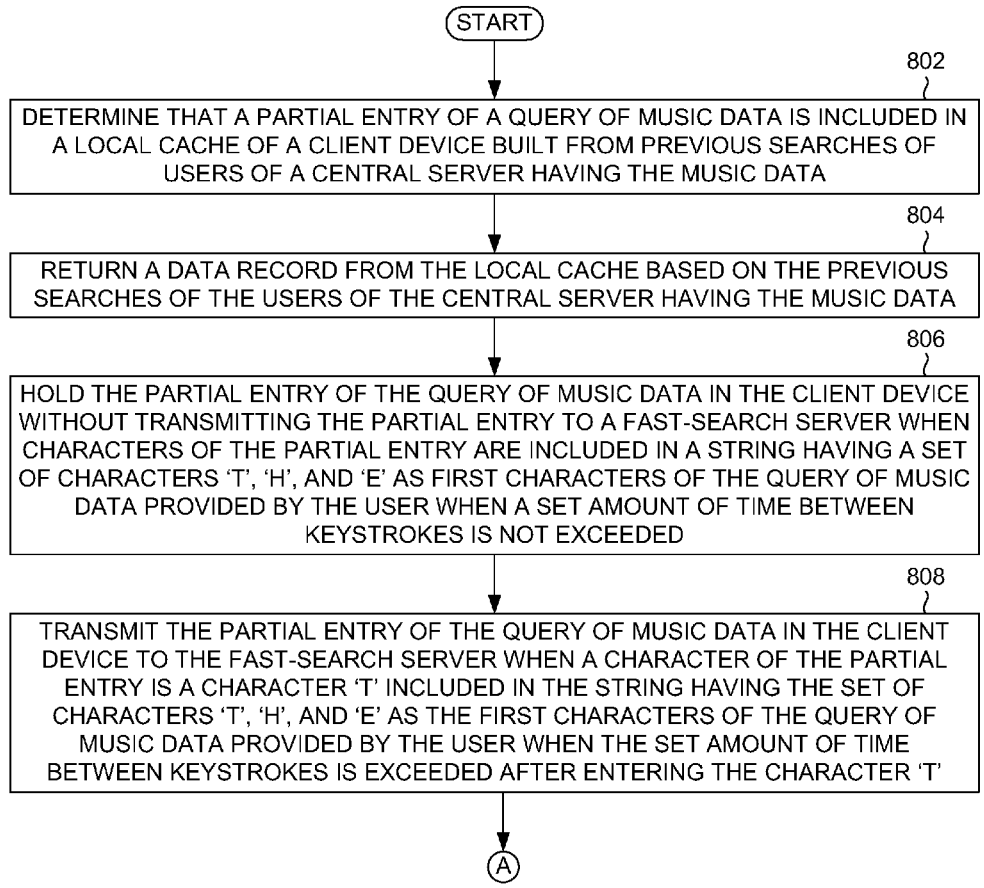
FIG. 8A is a process flow of controlling the flow of characters to the fast-search server, according to one embodiment.

FIG. 8A is a process flow of controlling the flow of characters to the fast-search server (e.g., the fast-search server 106 of FIG. 1), according to one embodiment. In operation 802, a partial entry of a may be determined query of music data may be included in a local cache (e.g., the local cache 214 of FIG. 2) of a client device (e.g., the client device 102A-N of FIG. 1) built from previous searches of a users of a central server (e.g., the central server 108 of FIG. 1) having the music data. In operation 804, a data record may be returned (e.g., using results cache 218 of FIG. 2) from the local cache 214 based on the previous searches of the users (e.g., from search cache 216 of FIG. 2) of the central server 108 having the music data.

In operation 806, the partial entry of the query of music data may be held (e.g., using the optimization module 200 of FIG. 2) in the client device 102A-N without transmitting the partial entry to the fast-search server 106 when characters of the partial entry are included in a string having a set of characters 't', 'h', and 'e' as first characters of the query of music data provided by the user 104 when a set amount of time between keystrokes is not exceeded.

In operation 808, the partial entry of the query of music data may be transmitted (e.g., using the optimization module 200 of FIG. 2) in the client device 102A-N to the fast-search server 106 when a character of the partial entry is a character 't' included in the string having the set of characters 't', 'h', and 'e' as the first characters of the query of music data provided by the user 104 when the set amount of time between keystrokes is exceeded after entering the character 't'.

Figure 8B:
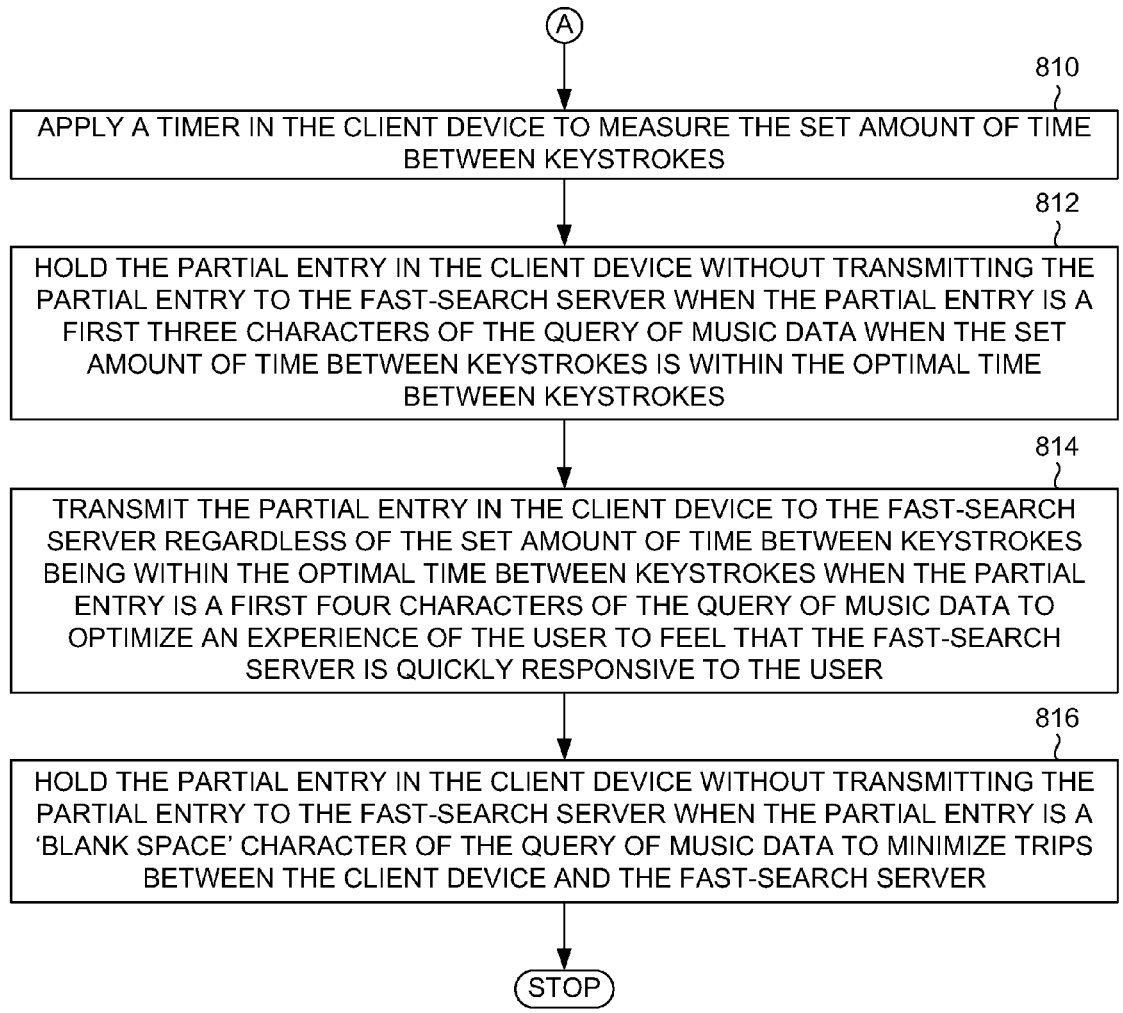
FIG. 8B is a continuation of the process flow of FIG. 8A illustrating additional processes, according to one embodiment.

FIG. 8B is a continuation of the process flow of FIG. 8A illustrating additional processes, according to one embodiment. In operation 810, a timer may be applied (e.g., using the timer module 204 of FIG. 2) in the client device 102A-N to measure the set amount of time between keystrokes. An optimal time between keystrokes may be approximately 200 milliseconds. In operation 812, the partial entry may be held (e.g., using the keystroke module 202 of FIG. 2) in the client device 102A-N without transmitting the partial entry to the fast-search server 106 when the partial entry may be first three characters of the query of music data when the set amount of time between keystrokes may be within the optimal time between keystrokes.

In operation 814, the partial entry may be transmitted (e.g., using the four-send module 208 of FIG. 2) in the client device 102A-N to the fast-search server 106 regardless of the set amount of time between keystrokes being within the optimal time between keystrokes when the partial entry may be first four characters of the query of music data to optimize an experience of the user 104 to feel that the fast-search server 106 is quickly responsive to the user.

In operation 816, the partial entry may be held (e.g., using the space module 206 of FIG. 2) in the client device 102A-N without transmitting the partial entry to the fast-search server 106 when the partial entry may be a 'blank space' character of the query of music data to minimize trips between the client device 102A-N and the fast-search server 106.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the optimization module 200, the keystroke module 202, the timer module 204, the space module 206, the four-send module 208, the symbol detection module 210, the delete module 212, the processing module 300, the spelling module 302, a comparison module 304, the approximation module 306, the text matching module 308, the prefork module 310, the concurrency minimization module 312, and the spelling index module 314 and/or other modules of FIGS. 1-8B may be enabled using an optimization circuit, a keystroke circuit, a timer circuit, a space circuit, a four-send circuit, symbol detection circuit, a delete circuit, a processing circuit, a spelling circuit, a comparison circuit, an approximation circuit, a text matching circuit, a prefork circuit, a concurrency minimization circuit, and a spelling index circuit and/or other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order.

The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:

1. A method comprising:
processing at least one character of a query of music data from a user of a client device through a reverse index stored in a fast search server, the reverse index being created based on indexing character data from a music database stored in a central server, the fast search server being distinct from the central server and the client device, the client device being coupled to the fast search server through a network, the client device being configured to communicate with the central server through the fast search server, and at least one previous search result associated with a corresponding at least one previous query of music data being configured to be cached at the client device; referencing the at least one character with the reverse index;
providing a capability to determine that the at least one character matches a data record of the music database based on the reverse index through the client device communicating with the central server through the fast search server and a capability to determine that the at least one character matches the cached at least one previous search result; and
returning at least one of the data record of the music database, the cached at least one previous search result, and a partial search result associated with the cached at least one previous search result prior to receiving all characters of the query of music data;
storing the query of music data in a cache of the client device configured to also include the cached at least one previous search result to enable optimization of a speed of addressing a subsequent query of music data; and
preforking, through the fast search server, the at least one character of the query of music data along with other processes in the fast search server to minimize concurrency issues and to minimize threading locks; and
utilizing the cache of the client device to retrieve a previous data record of previous characters typed in the query of music data before the user enters the at least one character of the query when the user deletes an entry of the at least one character of the query from the query.

2. The method of claim 1, comprising creating the reverse index stored in the fast search server from a combination of letters appearing as a string in a data field of the music database.

3. The method of claim 1, comprising creating the reverse index stored in the fast search server from a plurality of data fields of the music database including an artist field, an album field, and a track field.

4. The method of claim 1, wherein the query includes the previous characters typed in the query and other characters provided by different users querying the data record.

5. The method of claim 1, further comprising:
holding the at least one character of the query of music data in the client device without transmitting the at least one character to the fast search server when the at least one character of the query of music data is included in a string having a set of characters 't', 'h', and 'e' as first characters of the query of music data provided by the user when a set amount of time between keystrokes is not exceeded; and
transmitting the at least one character of the query of music data in the client device to the fast search server when the at least one character of the query of music data is a character 't' included in the string having the set of characters 't', 'h', and 'e' as the first characters of the query of music data provided by the user when the set amount of time between keystrokes is exceeded after entering the character 't'.

6. The method of claim 5, further comprising:
applying a timer in the client device to measure the set amount of time between keystrokes.

7. The method of claim 6, further comprising:
holding a first three characters of the query of music data in the client device without transmitting the at least one character to the fast-search server when the set amount of time between keystrokes is within an optimal time between keystrokes;
transmitting a first four characters of the query of music data in the client device to the fast search server regardless of the set amount of time between keystrokes being within the optimal time between keystrokes to optimize an experience of the user to feel that the fast search server is quickly responsive to the user; and
holding a 'blank space' character of the query of music data in the client device without transmitting the 'blank space' character to the fast search server to minimize trips between the client device and the fast search server.

8. The method of claim 7, further comprising:
applying a spelling index of the fast search server which references a misspelling database of the central server to determine whether the query of music data is a misspelling of the data record of the central server; and
altering the misspelling of the query of music data to a correct spelling when the query of music data is determined to be the misspelling of the data record.

9. The method of claim 8, wherein the data record is at least one of an artist name, an artist album, a genre, an album data, a track data, a lyrics data, a blog post data, a user profile data, a user interest data, and a playlist data.

10. The method of claim 1, in a form of a machine-readable medium embodying a set of instructions that, when executed by a machine, causes the machine to perform the method of claim 1.

11. A method of improving music search responsiveness, comprising:
processing at least one character of a query of music data from a user of a client device through a reverse index stored in a fast search server, the reverse index being created based on indexing character data from a music database stored in a central server, the client device being coupled to the fast search server through a network, the client device being configured to communicate with the central server through the fast search server, the reverse index providing a capability to determine whether the at least one character matches a data record of the music database through the client device communicating with the central server through the fast search server, and the fast search server being distinct from the central server and the client device;
determining that a partial entry of the query of music data is included in a cache associated with the client device built from previous searches of a plurality of users of the central server having the music data; and returning a data record from the local cache based on the previous searches of the plurality of users of the central server having the music data;
storing the query of music data in a cache of the client device configured to also include the cached at least one previous search result to enable optimization of a speed of addressing a subsequent query of music data; and
preforking, through the fast search server, the at least one character of the query of music data along with other processes in the fast search server to minimize concurrency issues and to minimize threading locks; and
utilizing the cache of the client device to retrieve a previous data record of previous characters typed in the query of music data before the user enters the at least one character of the query when the user deletes an entry of the at least one character of the query from the query.

12. The method of claim 11, further comprising:
holding the partial entry of the query of music data in the client device without transmitting the partial entry to the fast search server when characters of the partial entry are included in a string having a set of characters 't', 'h', and 'e' as first characters of the query of music data provided by the user when a set amount of time between keystrokes is not exceeded; and
transmitting the partial entry of the query of music data in the client device to the fast search server when a character of the partial entry is a character 't' included in the string having the set of characters 't', 'h', and 'e' as the first characters of the query of music data provided by the user when the set amount of time between keystrokes is exceeded after entering the character 't'.

13. The method of claim 12, further comprising:
applying a timer in the client device to measure the set amount of time between keystrokes.

14. The method of claim 13, further comprising:
holding the partial entry in the client device without transmitting the partial entry to the fast search server when the partial entry is a first three characters of the query of music data when the set amount of time between keystrokes is within an optimal time between keystrokes;
transmitting the partial entry in the client device to the fast search server regardless of the set amount of time between keystrokes being within the optimal time between keystrokes when the partial entry is a first four characters of the query of music data to optimize an experience of the user to feel that the fast search server is quickly responsive to the user; and
holding the partial entry in the client device without transmitting the partial entry to the fast search server when the partial entry is a 'blank space' character of the query of music data to minimize trips between the client device and the fast search server.

15. A system, comprising:
a central server including a plurality of data records of a music database;
a network;
a client device to originate a query of music data from a user thereof, and
a fast search server coupled to the central server having a processing module to process at least one character of the query of music data from the client device through a reverse index stored therein, the reverse index being created based on indexing character data from the music database stored in the central server, the client device being coupled to the fast search server through the network, the client device being configured to communicate with the central server through the fast search server~and the reverse index providing a capability to determine whether the at least one character of the query matches a data record of the music database through the client device communicating with the central server through the fast search server, wherein the client device includes a cache built from previous partial searches and results of a plurality of users of a plurality of client devices which query the data records of the music database of the central server to enable a quick response to the query;

storing the query of music data in a cache of the client device configured to also include the cached at least one previous search result to enable optimization of a speed of addressing a subsequent query of music data; and preforking, through the fast search server, the at least one character of the query of music data along with other processes in the fast search server to minimize concurrency issues and to minimize threading locks; and utilizing the cache of the client device to retrieve a previous data record of previous characters typed in the query of music data before the user enters the at least one character of the query when the user deletes an entry of the at least one character of the query from the query.

16. The system of claim 15, wherein the fast search server further comprises:

a spelling module to apply a spelling index which references a misspelling database of the central server to determine whether the query of music data is a misspelling of the data records of the central server, and to alter the misspelling of the query of music data to a correct spelling when the query of music data is determined to be the misspelling of one of the data records.

17. The system of claim 15, further comprising at least one of:

an optimization module of the client device to hold the partial entry of the query of the data records of the music database in the client device without transmitting the partial entry to the fast-search server when characters of the partial entry are part of a string having a set of characters 't', 'h', and 'e' as first characters of the query of the data records of the music database when a set amount of time between keystrokes is not exceeded, and to transmit the partial entry of the query of music data in the client device to the fast search server when a character of the query of music data is a character 't' included in the string having the set of characters 't', 'h', and 'e' as the first characters of the query of music data provided by the user when the set amount of time between keystrokes is exceeded after entering the character 't';

a timer module to apply a timer in the client device to measure the set amount of time between keystrokes;

a keystroke module of the client device to hold the partial entry in the client device without transmitting the partial entry to the fast-search server when the partial entry is a first three characters of the query of music data when the set amount of time between keystrokes is within an optimal time between keystrokes;

a four-send module of the client device to transmit the partial entry in the client device to the fast search server regardless of the set amount of time between keystrokes being within the optimal time between keystrokes when the partial entry is a first four characters of the query of music data to optimize an experience of the user to feel that the fast-search server is quickly responsive to the user;

a space module of the client device to hold the partial entry in the client device without transmitting the partial entry to the fast search server when the partial entry is a 'blank space' character of the query of music data to minimize trips between the client device and the fast search server; and a delete module of the client device to utilize the cache to retrieve a previous record of previous characters typed in the query of music data before a user entered the partial entry of the query through an application of the cache in providing the previous data record when the user deletes an entry of any character of the query from the query.

18. The system of claim 15, wherein the data record is at least one of an artist name, an artist album, a genre, an album data, a track data, a lyrics data, a blog post data, a user profile data, a user interest data, and a playlist data, wherein the reverse index stored in the fast search server is created from a combination of letters appearing as a string in a data field of the music database, and wherein the reverse index stored in the fast search server is created from a plurality of data fields of the music database including an artist field, an album field, and a track.

* * * * *

UNITED STATES PATENT AND TRADEMARK OFFICE
CERTIFICATE OF CORRECTION

| | | |
|---|---|---|
| PATENT NO. | : 8,688,674 B2 | Page 1 of 1 |
| APPLICATION NO. | : 12/031697 | |
| DATED | : April 1, 2014 | |
| INVENTOR(S) | : Lucas S. Carlson | |

It is certified that error appears in the above-identified patent and that said Letters Patent is hereby corrected as shown below:

In The Specification

Column 4, after Line 43 and before Line 44, please insert the following paragraph:

--FIG. 6 is a diagrammatic system view of a data processing system, according to one embodiment.--

Signed and Sealed this
Third Day of May, 2016

Michelle K. Lee
*Director of the United States Patent and Trademark Office*